United States Patent [19]

Noel

[11] Patent Number: 5,327,623
[45] Date of Patent: Jul. 12, 1994

[54] SEMI-AUTOMATED BUTTON CLOSING MACHINE

[76] Inventor: Charles E. Noel, 1563 Paradise Ave., Hamden, Conn. 06514

[21] Appl. No.: 648,807

[22] Filed: Jan. 31, 1991

[51] Int. Cl.$^5$ .............................................. B21F 45/26
[52] U.S. Cl. ........................................ 29/4; 29/559; 29/710; 29/715; 29/721; 29/445; 29/33 J; 29/785; 29/818; 79/1; 269/21; 279/3
[58] Field of Search ............... 79/1; 29/720, 721, 710, 29/715, 822, 4, 559, 743, DIG. 44, 33 J, 38 A, 785, 792, 445, 525.1, 818; 279/3; 269/21

[56] References Cited

U.S. PATENT DOCUMENTS

| | | | |
|---|---|---|---|
| 598,711 | 2/1898 | Ludington | 29/4 |
| 2,348,441 | 5/1944 | Walker | 79/1 |
| 2,414,574 | 1/1947 | Williams | 279/3 |
| 2,691,937 | 10/1954 | Emerson | 279/3 |
| 3,067,496 | 12/1962 | Rayburn | 29/743 |
| 3,484,093 | 12/1969 | Mermelstein | 279/3 X |
| 3,802,051 | 4/1974 | Andler et al. | 29/710 X |
| 3,802,052 | 4/1974 | Andler et al. | 29/710 |
| 3,815,221 | 6/1974 | Pearl | 29/559 |
| 4,221,139 | 9/1980 | Peterson | 79/1 |
| 4,602,417 | 7/1986 | Mesch et al. | 269/21 X |
| 4,616,410 | 10/1986 | Stokoe et al. | 29/743 |
| 4,763,391 | 8/1988 | Yoshioka et al. | 29/784 X |
| 4,829,662 | 5/1989 | Braunberger | 29/792 |
| 4,850,102 | 7/1989 | Hironaka et al. | 29/822 X |
| 4,939,838 | 7/1990 | Gatta | 29/822 X |
| 4,989,845 | 2/1991 | Kunta | 269/21 |
| 5,113,572 | 5/1992 | Trocola | 29/788 X |

FOREIGN PATENT DOCUMENTS

1213209 11/1970 United Kingdom ..................... 79/1
1222131 2/1971 United Kingdom ..................... 79/1

Primary Examiner—Mark Rosenbaum
Assistant Examiner—Frances Han

[57] ABSTRACT

A method and apparatus for substantially automatically joining front and back parts of buttons employs a turntable with retaining means that are rotated through a series of stations at which the parts are placed in the retaining means in a desired orientation, joined, and checked for defects. A human operator places button front parts at a first station, and the remaining stations carry out the assembly and quality control steps automatically. Placement at the first station determines the alignment and orientation of the two buttons.

46 Claims, 9 Drawing Sheets

SEMI-AUTOMATED BUTTON CLOSING MACHINE

FIELD OF THE INVENTION

The present invention relates to a method and apparatus for manufacturing buttons having an ornamental front portion and a back portion which includes a loop.

BACKGROUND OF THE INVENTION

The manufacture of a button requires the alignment and joining of a front and back portion. Alignment is necessary because the front of the button ordinarily has a design that is intended to be viewed at a particular orientation, and the back of the button has a loop that is to be sewn onto a piece of clothing at a particular orientation. The two button portions must be coordinated if the design on the front is to appear correct to an observer of the clothing.

The joining step, of course, holds the front to the back, and maintains the two pieces at the desired orientation.

At present the button forming operation is carried out manually by an operator using a single press to form buttons one at a time. With one hand, the operator places a front piece into a cradle on the press with the design on the front aligned as desired. A back piece is then placed on the front piece. The operator then activates the press, with the design on the front aligned as desired. The operator then activates the press, usually by a foot pedal, to join the pieces together. The completed button is manually removed from the press and the process is repeated.

From the foregoing illustration, numerous shortcomings are apparent in the present mode of button manufacturing. First, the production rate of buttons processed in this fashion is subject to limitations in the operator's faculties, including physical dexterity in handling the button pieces and mental dexterity in aligning them.

Second, and relatedly, the quality control in such a manual process is subject to variations in a given operator's work, and from operator to operator. Thus, the production of properly formed buttons having designs consistently oriented within an acceptable margin of error is difficult if not impossible to achieve.

Third, the basic flow of the manual process requires that a button be produced to completion before the manufacture of the next button is begun.

Finally, the manual operation of a press machine poses occupational hazards to the press operator.

It is therefore an object of the present invention to improve the production rate of buttons over that of the manual method.

It is another object of the invention to improve the alignment of the button pieces with one another.

It is a further object of the invention to improve the quality control over the button manufacturing process by constraining the range of error which occurs during production.

It is still another object of the invention to provide a streamlined production process in which buttons are simultaneously assembled in a series of steps.

It is yet another object of the invention to provide a button forming machine in which occupational hazards are minimized.

SUMMARY OF THE INVENTION

These and other objects of the invention that would be apparent to one skilled in the art are provided by the present invention, which comprises a rotating turntable having nests spaced around its circumference for holding the button pieces, and work stations spaced around the turntable for performing the various aligning, joining, and quality control operations.

The turntable has at least seven nests located on nubs extending from its circumference. The nests are spaced so that they can simultaneously line up with the work stations around the turntable.

At a first work station, a human operator is responsible for loading a button front piece into a nest and properly aligning the orientation of the front piece's design as it sits in the nest. The operator places each button front face down and in the same orientation.

A second work station employs an optical sensor to verify that a button front piece has been placed in the nest. If no front piece is present, the third station (see below) will be directed not to supply a button back piece to the nest.

The third work station uses a pick and place mechanism to automatically place back pieces into the front pieces with the two pieces properly aligned. For this purpose, the pick and place mechanism is automatically and continuously fed back pieces with loops up and in uniform alignment.

At a fourth station, another optical sensor is used, to detect whether a back piece has been placed in the front piece in a proper orientation. If a problem is detected, the pieces in the nest will be removed at station six (see below). In addition, the press at station five (see below) will be directed not to operate on these pieces.

Station five joins the pieces to form a finished button, using a press.

At a sixth station, a vacuum removes those pieces determined by the sensor at station four to be rejects. Rejected parts can generally be re-used or re-worked.

The seventh station removes properly finished buttons, also by vacuum.

BRIEF DESCRIPTION OF THE DRAWINGS

FIG. 3 is a perspective view of a simplified device for automatically loading button shells into nests on a turntable;

DETAILED DESCRIPTION OF THE PREFERRED EMBODIMENTS

Figure 1:
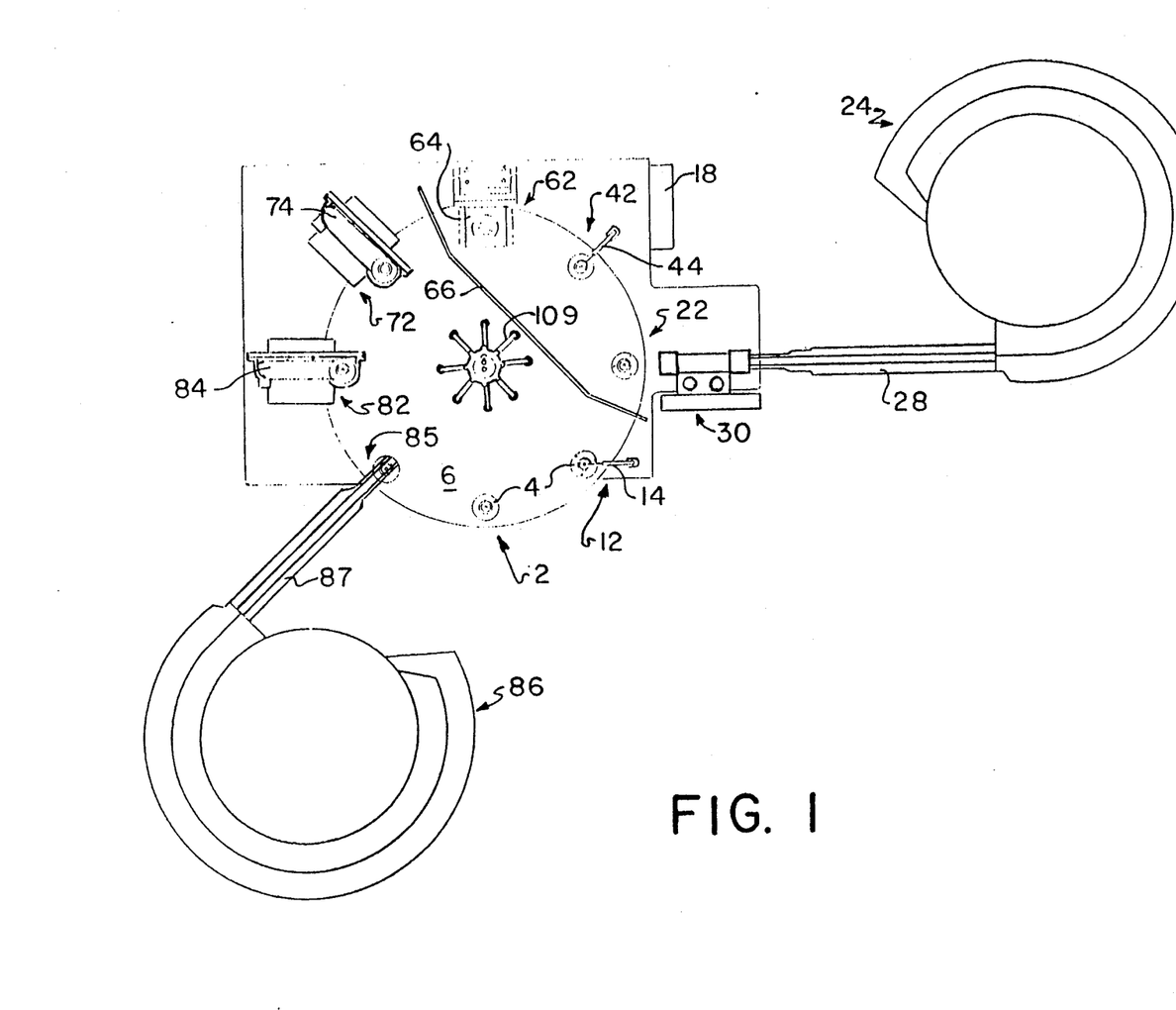
FIG. 1 is a plan view of the machine of the present invention as seen from above.
Figure 2:
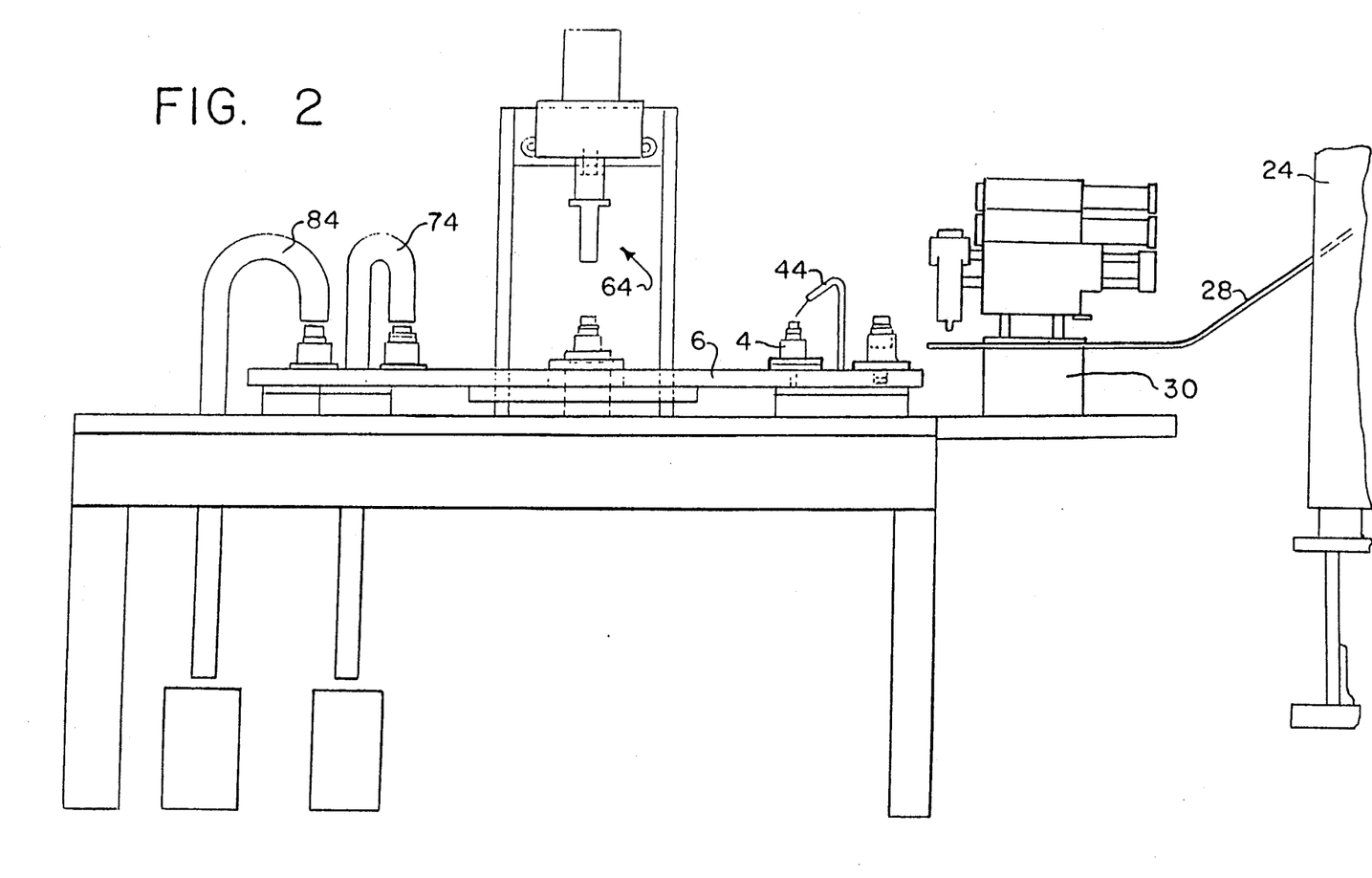
FIG. 2 is a side plan view of the machine of FIG. 1, showing the third through seventh button-assembly stations.

According to the present invention as shown in FIGS. 1 and 2, at a first work station 2, button front shells are placed face down in nests 4 on turntable 6, as those nests are successively rotated to the first work station 2. The placement of shells, according to the present invention, is preferably by a human operator. In any case, each shell is oriented in the same direction when it is placed, for reasons explained below.

The turntable 6 is a circular disk having eight nests 4 located at 45° intervals around the turntable and an equal distance from the center.

Figure 3:
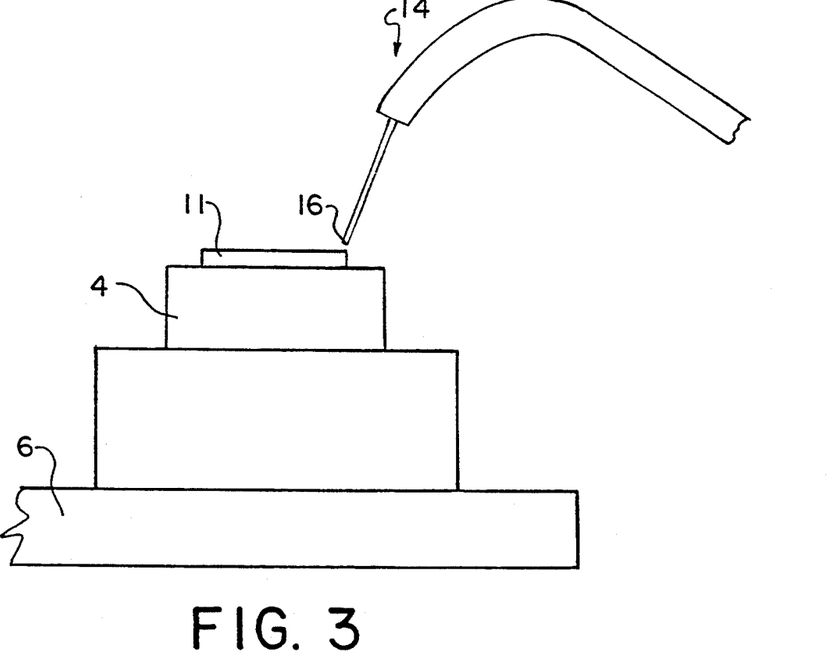
FIG. 3 is a detail view of the sensor at the second station.

Once a shell is loaded into a nest 4, turntable 6 is rotated to move the shell and nest to a second station 12. At this second station, an optical sensor 14 is used to ascertain that a button shell was in fact placed at the first station. Thus, as shown in FIG. 3, end 16 of sensor 14 is positioned so that it will be very close to a shell 11 in a nest which arrives at the second station. In the event no shell is present, sensor 14 will detect a space where a shell should be.

Sensor 14 prevents unnecessary or wasteful performance of further assembly steps when a nest without a shell is rotated to later stations. Signals from sensor 14 are sent to a microprocessor unit 18, which controls the functions at the various stations around the turntable. If a nest is found empty by sensor 14, microprocessor 18 will direct later stations to refrain from performing their button assembly functions on that nest.

A shell found to be positioned in the nest 4 at the second station is then advanced by rotation of turntable 6 to a third work station 22. This work station includes a vibrating bowl assembly 24, which provides button backs to a pick and place mechanism 30. The button backs are identically aligned as they are fed to pick and place mechanism 30. The common alignment is maintained by entry of the backs into slotted track 28. Pick and place mechanism 30 consequently receives every back at the same position.

Pick and place mechanism 30 can be a purchased item such as the "Dura-Place" pick and place transfer device made by R&I Manufacturing Co., Thomaston, Conn. Vibrating bowl assembly 24 is also commonly known and available. Devices made by Parts Feeder, Inc., East Hartford, Conn., have proven satisfactory.

Figure 4:
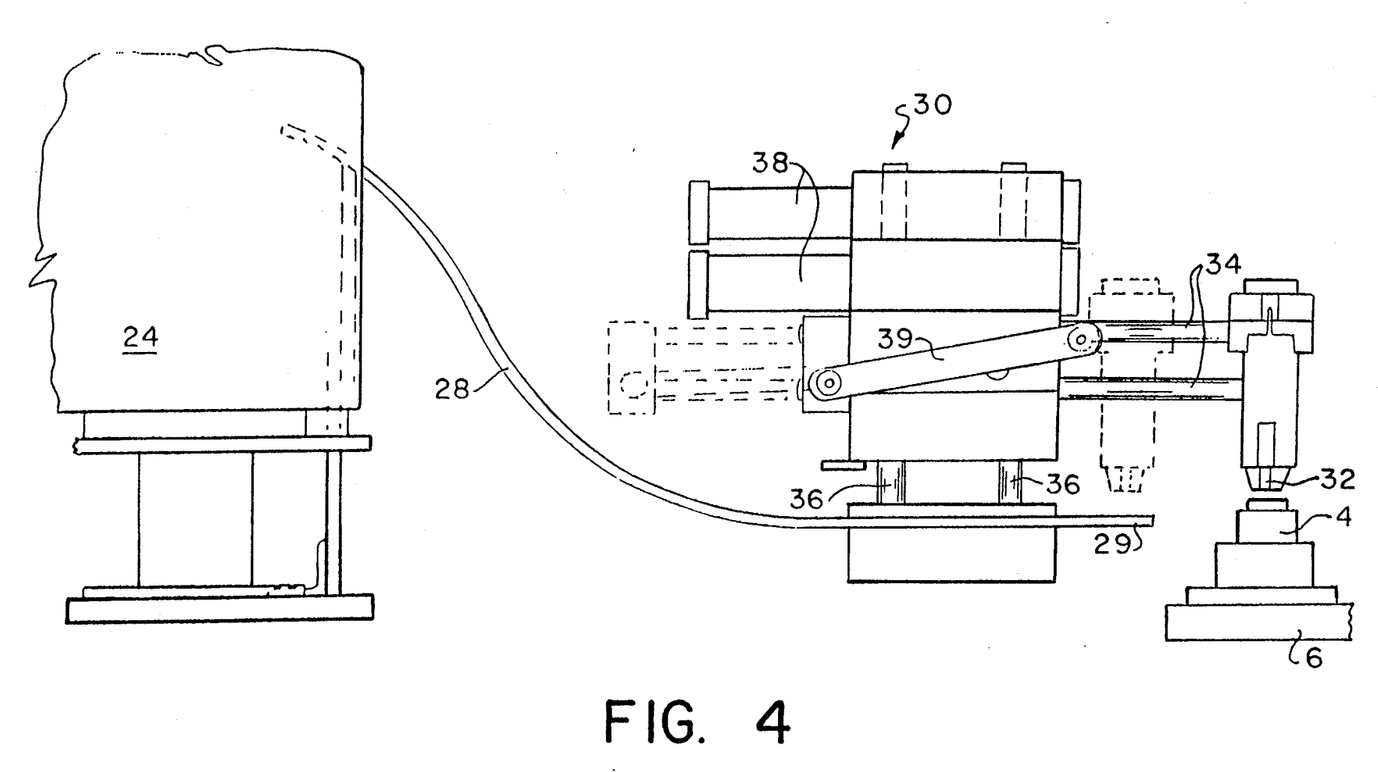
FIG. 4 is a close-up view of the pick and place mechanism of the third station.

The placement and operation of station 22 are shown in FIG. 4. Button backs are fed from bowl 24 down track 28, which runs alongside pick and place mechanism 30. Suction finger 32 on mechanism 30 picks up shells at the end 29 of track 28, and transfers the backs to nests 4 on turntable 6.

Finger 32 on mechanism 30 is simultaneously moved vertically and horizontally, with horizontal movement based on shaft pair 34 and vertical movement on shaft pair 36. Air cylinders 38 cause linkage 39 to rotate and move the mechanism as described.

Because the backs 21 are uniformly aligned in track 28, they are each placed in the same orientation in nests 4. The placement of shells at first station 2, combined with the uniform orientation in which backs are placed at third station 22, determines the relative orientation of the front of a button to its back. Placement of the shell in a proper rotational orientation therefore is the essential variable in aligning front and back parts as desired. Where a human operator places the shells, it is consequently an important aspect of his or her task to ensure proper alignment of the shells, considered with respect to the manner in which backs will be placed, so that the combined parts will be properly correlated.

Once a button back has been placed in a button shell, the turntable is rotated and the combined button parts are moved to a fourth station 42, shown in FIGS. 1 and 2. There, another optical sensor 44 is used to check for a full button (back and front) and for proper alignment of the back piece.

Figure 5:
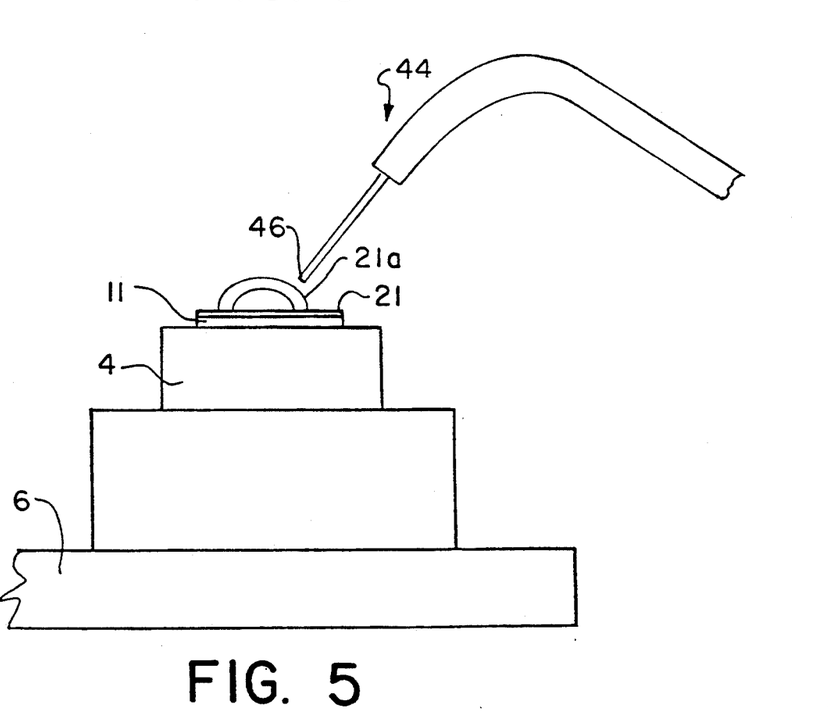
FIG. 5 is a detail view of the sensor at the fourth station.

FIG. 5 shows the arrangement at the fourth station. When a button back 21 is properly disposed within its corresponding shell 11 in nest 4, end 46 of sensor 44 will abut the side of loop 21a on the back 21. On the other hand, when a button back is out of alignment or not present, end 46 will not be so closely positioned near loop 21a, or will be exposed to the loop hole instead of the side of the loop. The sensitivity of the sensor 44 is adjusted so that only acceptably oriented back parts will trigger a positive response from the sensor. As with sensor 14 at the second station, the detection of an undesirable button assembly by the sensor will prompt microprocessor 18 to discontinue the performance of later assembly steps. In addition, the detection of an undesirable assembly will prompt the removal of the misaligned parts at a reject station (see below regarding the sixth station).

Figure 6:
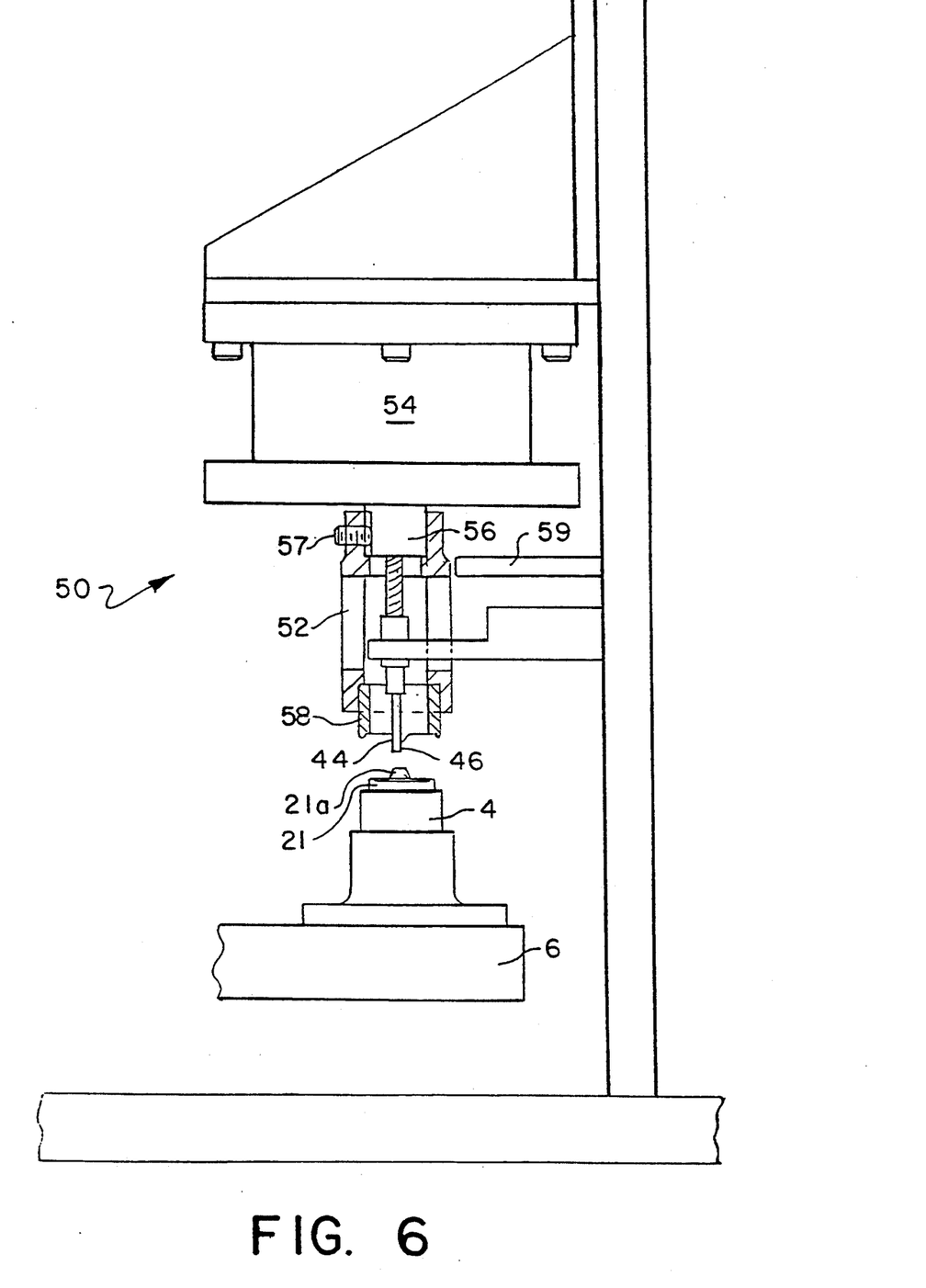
FIG. 6 is a close-up view of a crimper and detection device which may be used at the fourth station.

According to a particularly preferred embodiment of the invention, the structure and functions of optical sensor 44 are incorporated into a crimper device 50, as shown in FIG. 6. The crimper performs the added function of crimping the button pieces at their edges to initially secure the back of the button to the front in a satisfactory orientation.

The crimper also stretches the edge material of the button parts, which eases the final forming of the buttons and improves the appearance of the final product, because the final forming press is given more material with which to work.

Optical sensor 44 is mounted down the center of reciprocating crimping shaft 52. Crimping shaft 52 is moved by air cylinder 54, and moves vertically around the sensor 44, which remains stationary. Crimping shaft 52 is connected to air cylinder shaft 56 by a set screw 57, which allows for adjustment between the two shafts.

End 46 of sensor 44 is positioned, as in the embodiment of FIG. 5, to abut the loop 21a of a back 21 when a nest 4 is moved into position by turntable 6. Sensor 44 operates in the same way as in the embodiment of FIG. 5, signalling the machine to continue or discontinue assembly of the button in the given nest, depending on whether or not it senses the presence of a full button and proper alignment of the back piece.

In the combined sensor and crimper, the constant position of sensor 44 allows it to determine whether a proper button assembly is present as soon as a nest 4 arrives. If an undesirable button assembly is detected, even the crimping step will be preempted, by an immediate command to the crimper section of the device not to crimp.

If a satisfactory button assembly is present, shaft 52 will be forced downwardly by air cylinder 54, and crimping punch 58 on the lower end of shaft 52 will crimp the button parts in nest 4. Crimping punch 58 is an interchangeable part, and the specific punch used will depend on the size of the button parts being crimped.

Crimper 50 could also include a proximity switch 59 for monitoring the continuity of the crimping operation. Although not presently employed, switch 59 would sense when crimping shaft 52 returned to a retracted position after each crimping step. If the shaft had not retracted, switch 59 would stop production until the problem was remedied. This arrangement prevents the crimper from colliding with the rotating turntable and nests.

The assembly process at the fourth station is complete when the optical sensing and, if applicable, crimping steps have been performed. The turntable then rotates again, bringing the nest to a fifth station 62, as shown in FIGS. 1 and 2, where a press 64 performs the final joining of the shell and back pieces of the button. Press 64 may be any of numerous models currently used for stamping tasks like the present one, and selection of a suitable press would be within the skill of an ordinary worker in the art. As an example, the Electropunch Model JS, made by Black & Webster of Waltham, Mass., may be used satisfactorily.

As previously explained, forming steps will not be carried out when either of the optical sensors at the second and fourth stations determines that an unsatisfactory product would be created. Part of the response to such a determination by the sensors is suspension of the operation of press 64 when the improperly constituted button parts arrive at the fifth station. This practice ultimately amounts to a significant saving on energy usage and wear on components.

A plexiglass shield 66 is provided across turntable 6 to prevent an operator from reaching for parts at the third, fourth, or fifth stations. Possible hazards for inattentive or careless operators are therefore minimized.

After the buttons are finally formed, the nests 4 are moved by rotation of turntable 6 to a sixth station 72. A vacuum tube 74 will there operate to remove the button parts from the nest if either of optical sensors 14 or 44 have signalled the presence of improperly constituted button parts. Parts removed by vacuum tube 74 will either be fed back into the supply of parts, or returned to the manufacturer for rework if they are inherently defective.

The vacuum at station six will operate only when it is called upon to remove a defective button assembly. This conserves the equipment and energy associated with the vacuum's operation, and of course avoids rejection of properly formed buttons.

Nest 4 is then rotated to a seventh station 82, where another vacuum tube 84 removes the good, finally formed buttons from the nests to a container for eventual sale. As with vacuum tube 74 at station six, vacuum tube 84 operates only when necessary, i.e., only when a properly formed button is present. This will be the case whenever the optical sensors at stations two and four indicate that the button parts are present and properly oriented.

The turntable shown and described herein comprises eight nests, and seven stations are provided for performing the various button assembly steps of the present invention. The eighth station could also be used by an operator for shell placement, if desired. It is noted, however, that any number of nests might be used, and the order of the stations might be rearranged, as long as the essential functions of the machine were not impaired. Such modifications would be obvious to one skilled in the art.

According to one possible modification of the present invention, shown in FIG. 1, an eighth station 85 may be provided having a vibrating bowl 86 and track 87 for supplying button shells to nests 4 in turntable 6. A pick and place mechanism like mechanism 30 at the third station can be used for taking shells from track 87 and placing those shells in nests 4.

Figure 7:
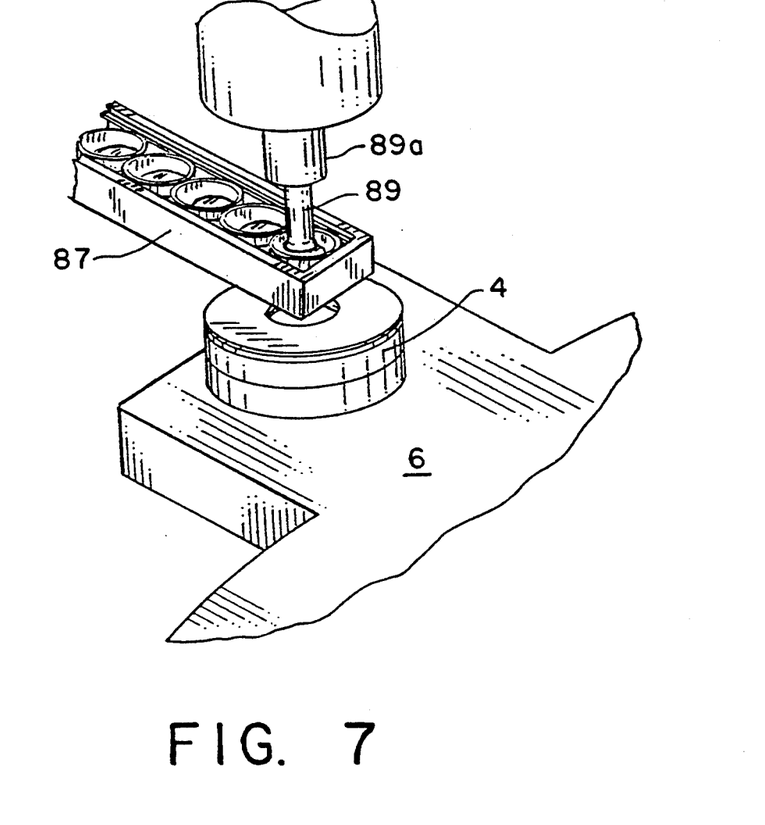
Figure 7A:
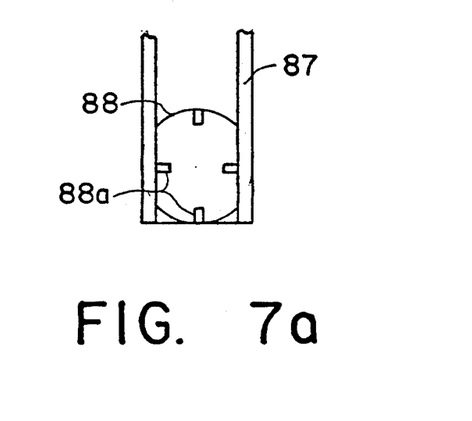
FIG. 7a is a top view of the end of the button part feeder track of FIG. 7.

A simpler device is preferred, however, for transferring button shells from track 87 into nests 4, and is shown in FIGS. 7 and 7a. At the end of feeder track 87, a track nest 88 is provided having spring pins 88a for supporting button shells when they are pushed into the track nest. Track nest 88 is located directly over the location where turntable nests 4 arrive at the eighth station.

To transfer shells from track nest 88 to turntable nests 4, a plunger 89 powered by air cylinder 89a is used. Plunger 89 pokes one shell past the spring pin restraints of track nest 88 each time a turntable nest 4 arrives at the eighth station. Track nest 88 is located close enough over turntable nests 4 that the proper placement of shells is consistent and reliable.

Under this modification of the invention, the task of a human operator at the first station 2 would merely be to adjust the rotational orientation of each shell placed at the eighth station, so that the desired relationship between front and back pieces will be achieved. Alternatively, if a random orientation of the front part is appropriate, then the human operator is not needed and operation of the machine can proceed on a fully automatic basis. This would apply, for example, where the button shell has a design which is symmetrical over 360° or has no design.

The turntable, as the above description of the invention would suggest, operates in an indexing fashion to sequentially and intermittently move the nests among the stations. To facilitate the "assembly line" operation of the machine, the nests are spaced to simultaneously line up with the stations. Indexing rotation of the turntable can be provided by any of a number of indexing apparatus commonly available and known to a person of ordinary skill in the art. One such device suitable for use with the present invention is the Camco Indexer Model 400RA, manufactured by Emerson Power Train Corporation, Wheeling, Ill.

As described above, a microprocessor 18 is used to monitor and coordinate the functions of the system. Such devices are known to those skilled in the art for the type of application involved here. A suitable microprocessor for use with the present invention is the Mitsubishi Melsec $F_2$-20M, Mitsubishi Electric Sales America, Inc., Mount Prospect, Ill.

Figure 8:
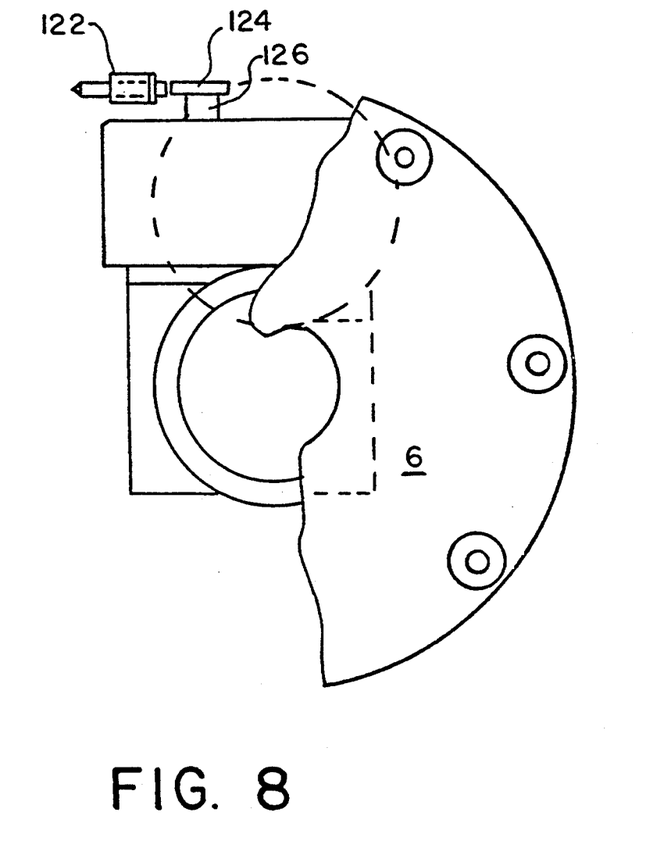
FIG. 8 is a cut-away view of the turntable of the present invention, showing a sensor for monitoring the indexing position of the turntable; nest suitable for use with the present invention.

In addition to the signals sent by the assembly devices at the various turntable stations, a ferrous metal sensor (proximity switch) monitors the functioning of the indexer. As illustrated by FIG. 8, the sensor 122 detects when the turntable is being indexed, and when it is not being indexed (i.e., in a "dwell" position), by sensing the position of a cam 124 on the indexer shaft 126. The sensor and cam are arranged so that the cam surface is close to the sensor in one rotational position, and further away in another. The cam thus acts as a flag for the sensor.

The signals from the switch are used to verify that the indexer is properly moving the turntable between indexed positions, in coordination with the other operations being performed. It is also used to signal the microprocessor when the turntable is in its dwell position between indexing movements, so that the microprocessor can issue immediate commands to the various button assembly devices to perform their given functions.

Proximity switches suitable for use with the invention include the model BI2-G12-AP6X made by Turck Multiprox, Inc., Minneapolis, Minn.

Figure 9:
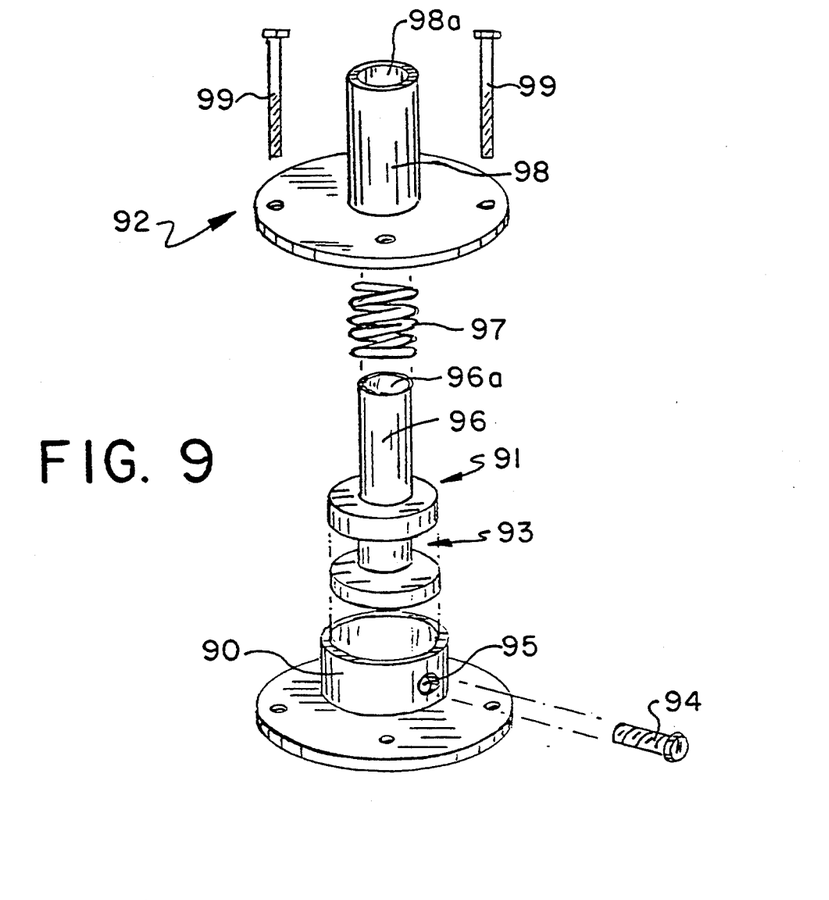
Figure 10:
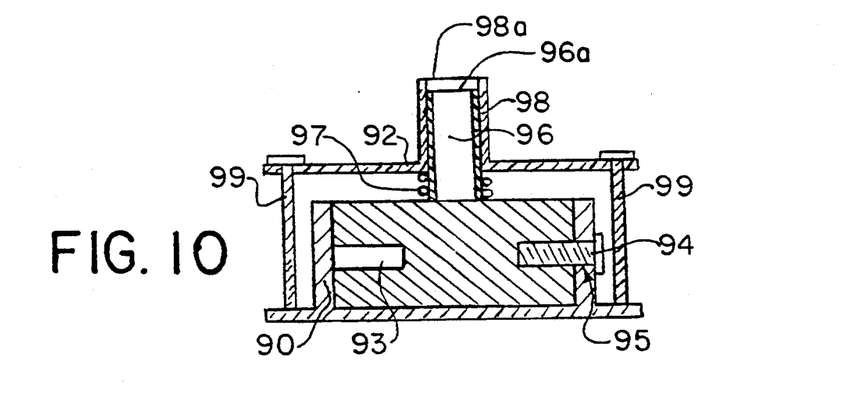
FIG. 10 is a cross-sectional view of the nest of FIG. 9.

The preferred type of nest 4 according to the present invention, holds its button parts in place by the use of vacuum suction. A typical nest is shown in FIGS. 9 and 10. FIG. 9 illustrates that the nest includes a base portion 90, core 91, and stripper 92. Core 91 has a locking groove 93, and is inserted into base 90, and held therein by a set screw 94 disposed through hole 95 in base 90. Shaft 96 of core 91 is preferably provided with a spring 97. Stripper 92 is placed on core 91 so that stripper 92 rests on spring 97, with stripper shaft 98 concentrically located around core shaft 96. Spring 97 pushes stripper 92 upward on core shaft 96, but stripper 92 is set to a maximum normal upward position by shoulder bolts 99.

In practice, a shell is normally supported on the end 98a of stripper shaft 98, because bolts 99 are set so that end 98a of stripper shaft 98 extends slightly above end 96a of core shaft 96. When the crimping and pressing steps are carried out, however, it is desirable to absorb the shock of those steps on the button pieces. This is accomplished by the retraction of the stripper against spring 97 when the crimper or press is brought down against the button pieces. Core shaft end 96a provides a lowermost support against depression of the button pieces and stripper.

Figure 11:
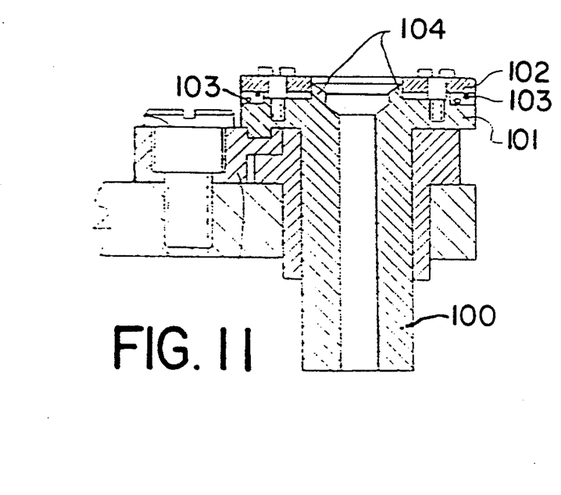
FIG. 11 is a cross-sectional view of an alternative type of nest suitable for use with the present invention.

Another type of nest which might be used, particularly when vacuum suction is not employed, is depicted in FIG. 11. This type comprises a shaft 100, collar 101, stripper disc 102, and wave spring 103. Collar disc 101 has an annular rim 104 which fits concentrically within a hole in stripper 102. Rim 104 defines the portion in which a button assembly is held. Stripper 102 also acts to keep a button in place, and for this purpose normally defines a deeper seat for the buttons than rim 104 alone. Wave spring 103 urges stripper 102 away from the collar 101 in order to maintain that deeper seat.

It is desirable, however, to provide for greater exposure of the button during crimping and pressing steps. Accordingly, stripper 102 can be pushed against the spring 103 until the stripper meets collar 101. At that point, a button will be surrounded only by the lower rim 104 and will be more exposed for crimping or pressing.

When the vacuum type nest is used it is necessary to remove the suction at stations where the button or button parts might be removed. A rotary valve 105 for effecting this selective application of vacuum and atmospheric pressure is shown in FIGS. 12–16.

Figure 12:
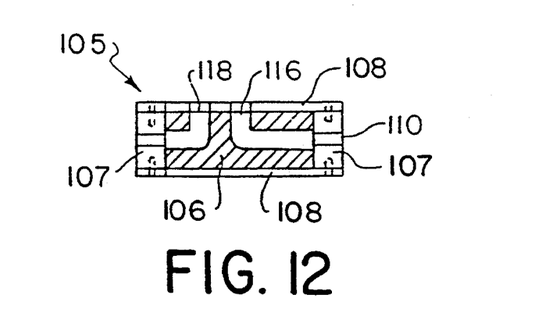
FIG. 12 is a cross-sectional view of the rotary valve of the present invention.
Figure 13:
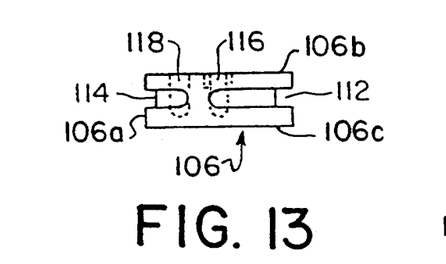
FIG. 13 is a side view of the rotor element of the rotary valve of FIG. 12.
Figure 14:
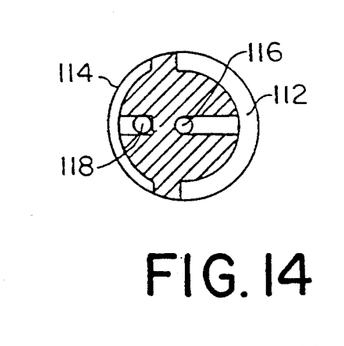
FIG. 14 is a top view of the rotor element of the rotary valve of FIG. 12.
Figure 15:
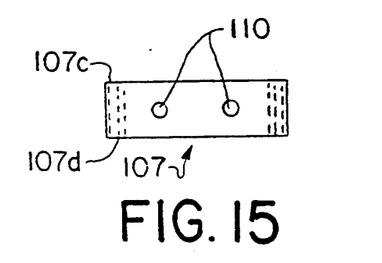
FIG. 15 is a side view of the distribution collar element of the rotary valve of FIG. 12.
Figure 16:
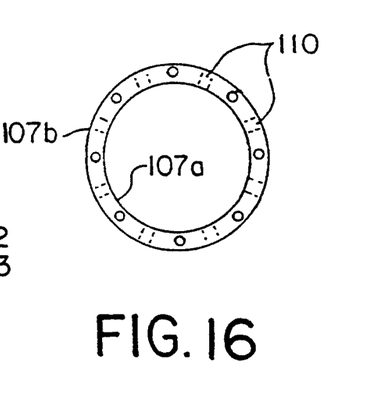
FIG. 16 is a top view of the distribution collar element of the rotary valve of FIG. 12.

Rotary valve 102 has two basic components: a central rotor 106, shown in FIGS. 13 and 14, and an annular distribution collar 107, shown in FIGS. 15 and 16. Rotor 106 and collar 107 are held between securement plates 108, shown in FIG. 12. Valve 105 is mounted in the center of turntable 18, coaxially therewith, as shown in FIG. 1. Nests 4 are connected by hoses 109 to passages 110 in collar 107, which is fastened to turntable 18 so that nests 4, collar 107 and hoses 109 rotate together on the turntable.

Rotor 106, on the other hand, is fastened to a stationary object off the turntable. Rotor 106 does not rotate, in order that collar 107 can rotate around it.

As shown in FIGS. 15 and 16, collar 107 has vertical inner and outer surfaces 107a and 107b, respectively, and horizontal top and bottom surfaces 107c and 107d, respectively. FIGS. 13 and 14 show that rotor 106 has a vertical circumferential surface 106a, and horizontal top and bottom surfaces 106b and 106c, respectively.

Rotor 106 has two channels 112, 114 around its circumference which communicate with passages 110 in collar 107 around the rotor. Channels 112, 114 separately lead to two openings 116, 118, respectively, in the top of rotor 106. A source of vacuum is connected to one of these openings, and the other opening is left exposed to atmospheric pressure (although each opening could be connected to positive or negative pressure as desired).

As the collar 107 rotates around rotor 106, passages 110 are alternately put in communication with channel 112 and then channel 114. By selecting a rotor 106 with channels 112, 114 in a particular arrangement, and by aligning those channels with the stations around the outside of the turntable, vacuum or atmospheric pressure is selectively applied to the nests at those stations as the turntable is indexed through its successive rotational positions. The semi-automatic button closing machine of the present invention calls for suction to hold the button pieces to the nests at stations one through five, and not at stations six through eight. Station eight may also require suction, when button shells are automatically loaded there.

The parts of rotary valve 105 are all ground to the proper, minimum clearance necessary to assure smooth and reliable operation. No gaskets are necessary, because when properly ground and fitted, the parts combine in a substantially leak-proof fit.

We claim:

1. A method for orienting two objects relative to one another, comprising:
   retaining a first object in a fixed rotational orientation upon retaining means at a first work station;
   sensing the placement of the first object upon the retaining means using an optical sensor and providing this information to a microprocessor which controls functions at each work station;
   advancing the retaining means to at least one subsequent work station;
   placing a second object adjacent the first object at a desired rotational orientation relative to the first object when said information indicates that the first object has been placed upon the retaining means; and
   applying suction to the retaining means to retain the first object therein at the first and the at least one subsequent work station.

2. The method of claim 1 which further comprises joining the second object to the first object in the desired orientation.

3. An apparatus for orienting two objects in a desired relationship comprising:
   a first work station including means for retaining a first object in a fixed rotational orientation;

optical means comprising an optical sensor for automatically detecting the placement of the first object upon the retaining means;

a second work station;

means for automatically and sequentially advancing the retaining means to the second work station;

means for placing a second object adjacent the first object at a predetermined rotational orientation relative to the first object; and vacuum means for retaining the first object within the retaining means including a source of vacuum in communication with the retaining means at the first and second work stations.

4. The apparatus of claim 3 further comprising means for securing the second object to the first object in the desired orientation to form a combination.

5. The apparatus of claim 4 wherein the second object is placed upon the first object and further comprising means to detect proper placement of the second object upon the first object.

6. The apparatus of claim 4 further comprising means for joining the second object to the first object to form an assembly.

7. The apparatus of claim 6 wherein the securing means is a crimping device and the joining means is a punch press.

8. The apparatus of claim 6 further comprising means for removing the assembly from the apparatus.

9. The apparatus of claim 3 further comprising means for removing improperly placed objects from the retaining means.

10. The apparatus of claim 3, wherein the retaining means is a turntable having a series of nests, and the turntable and the first and second work stations are operatively associated to sequentially and repetitively move the nests from the first station to the second station.

11. A method for producing buttons, comprising:
placing button front parts at a predetermined fixed rotational orientation on a retaining means on a turntable at a first placement station;

rotating the turntable to move the retaining means to a second station;

detecting the placement of the front parts in the retaining means at the second station;

discontinuing subsequent button assembly steps at the retaining means in response to detection at the second station of the absence of the button parts in the retaining means;

rotating the turntable to move the retaining means to a third station;

placing button back parts in a constant known rotational orientation adjacent the front parts at the third station;

rotating the turntable to move the retaining means to a fourth station;

detecting the presence of incomplete or improperly oriented button parts in the retaining means at the fourth station;

discontinuing the performance of subsequent button assembly steps at the retaining means in response to detection at the fourth station of incomplete or improperly oriented button parts in the retaining means;

crimping the back and front parts at the fourth station, to initially join them and fix their orientation;

rotating the turntable to move the retaining means to a fifth station;

pressing the front and back parts to form a finished button at the fifth station;

rotating the turntable to move the retaining means to a sixth station;

removing incomplete or improperly oriented button parts at the sixth station in response to the detection at the fourth station of an incomplete or improperly oriented button;

rotating the turntable to move the retaining means to a seventh station; and removing the finished button.

12. A method for forming buttons, comprising:
placing a button back part having a sewing loop thereon in a button front part having an emblem thereon to form a button assembly;

crimping the button assembly at a fixed work station to stretch the material of the button back part and the button front part and to fix the orientation of the sewing loop of the button back part with respect to the emblem of the button front part;

moving the button assembly to a second work station; and pressing the button assembly at the second work station to join the button back part and the button front part.

13. The method of claim 12 wherein the button front part has an emblem thereon and which further comprises using vacuum to fix the position of the emblem of the button front part at a predetermined orientation with respect to the button back part.

14. A method for producing buttons, comprising:
placing a first button part in a fixed known rotational orientation upon a retaining means at a first placement station;

moving the retaining means to a second placement station;

placing a second button part adjacent the first button part and in a desired known uniform rotational orientation with respect to form a combination thereof at the second placement station;

moving the combination in the retaining means to a pressing station;

pressing the combination to form a button assembly at the pressing station;

optically detecting incomplete or improperly oriented buttons; and discontinuing the pressing step when an incomplete or improperly oriented button is detected.

15. The method of claim 14, which further comprises the steps of moving the retaining means to a button assembly removal station, and removing the button assembly from the retaining means at the button assembly removal station.

16. The method of claim 14, wherein the second button part is placed at a known orientation, and the first button part is placed in a predetermined orientation based on the known orientation of the second button part, to obtain a desired orientation of the second button part with respect to the first button part.

17. The method of claim 14, wherein a plurality of retaining means are located on a turntable, and further comprising the step of rotating the turntable to move the retaining means sequentially to additional work stations.

18. A method for orienting two button parts comprising:

retaining a first button part having an emblem thereon in a fixed rotational orientation upon retaining means at a first work station;

advancing the retaining means to at least second and third subsequent work stations;

placing a second part adjacent and within a portion of the first part at the second work station at a predetermined rotational orientation with respect to the emblem on the first part;

joining the button parts at the third work station to form a button while maintaining the rotational alignment thereof; and applying suction to the retaining means to retain the first button part therein in said desired orientation at the first, second and third work stations.

19. The method of claim 18, which further comprises joining the first and second parts in the desired orientation to form a finished button.

20. The method of claim 19, which further comprises removing the finished button from the retaining means.

21. The method of claim 19, which further comprises crimping the first and second parts to initially join them and to fix their orientation, before the joining step.

22. The method of claim 18, wherein the second part is placed in a known orientation, and further comprising the step of placing the first part on a retaining means in a predetermined orientation based on the known orientation of the second part, to obtain the desired orientation of the second part with respect to the first part.

23. The method of claim 18, which further comprises detecting the presence of an incomplete or improperly oriented button before the joining step.

24. The method of claim 23, which further comprises discontinuing assembly of incomplete or improperly oriented buttons, and removing incomplete or improperly oriented button parts from the retaining means in response to the detecting step.

25. The method of claim 18, which further comprises detecting the presence of the first part in the retaining means before the second part placing step, and discontinuing assembly of a button in the retaining means if the presence of the first part is not detected.

26. The method of claim 18, wherein a turntable having at least six retaining means simultaneously and respectively aligns the retaining means with at least six button assembly stations and wherein the turntable successively indexes the retaining means through the stations.

27. An apparatus for orienting button parts in a desired relationship comprising:

a first work station including means for retaining a first button piece having an emblem thereon in a fixed rotational orientation;

a second work station;

a third work station;

means for advancing the retaining means to the second and third work stations;

means for placing a second button piece adjacent and within a portion of the first piece at a predetermined rotational orientation relative to the emblem on the first piece at the second work station; and vacuum means for retaining the first button piece within the retaining means including a source of vacuum in communication with the retaining means at the first, second and third work stations such that the emblem of the first button piece does not rotate with respect to the retaining means.

28. The apparatus of claim 27, further comprising means for joining the first and second pieces in the desired orientation to form a finished button.

29. The apparatus of claim 27, further comprising means for removing the finished button from the retaining means.

30. The apparatus of claim 27, further comprising means for determining the presence of an incomplete or improperly oriented button.

31. The apparatus of claim 30, further comprising means operatively associated with the determining means for removing the incomplete or improperly oriented buttons from the retaining means.

32. The apparatus of claim 27, further comprising means for crimping the front and back parts to fix the desired orientation.

33. The apparatus of claim 27, further comprising means for detecting the presence of the first button piece in the retaining means.

34. The apparatus of claim 33 further comprising means operatively associated with said detecting means for discontinuing assembly of the button.

35. The apparatus of claim 27, further comprising means for placing the first piece upon the retaining means.

36. The apparatus of claim 27, further comprising a turntable, wherein the retaining means comprises a plurality of nests located in spaced relation on the turntable, and wherein a plurality of stations are located around the turntable for performing button assembly steps as the nests are successively rotated to each of the plurality of stations.

37. The apparatus of claim 27 wherein the third work station includes means for joining the button parts.

38. An apparatus for producing buttons, comprising:

a turntable having a plurality of retaining means spaced around its circumference, and means for rotating the turntable to successively move the retaining means to a plurality of button assembly stations;

a button front part placement station at which button front parts are sequentially placed in the retaining means at a fixed rotational orientation;

means for detecting the placement of button front parts in the retaining means, located at a first detection station;

a back part placement station comprising means for placing button back parts in a desired known predetermined uniform rotational orientation with respect to the front parts;

a crimping and detection station comprising means for detecting incomplete or improperly oriented button parts and means for crimping the button parts together to fix the desired orientation;

a pressing station comprising a press for at least partially joining the back and front parts to form finished buttons;

a first vacuum removal station comprising first vacuum means for removing incomplete or improperly oriented buttons; and a second vacuum removal station, comprising vacuum means for removing the finished buttons.

39. The apparatus of claim 38, further comprising second vacuum means for maintaining the button parts within the retaining means, comprising a rotary valve having a source of vacuum in communication with the retaining means at the placement, detecting, crimping and detecting, and pressing stations, and having a vent to atmospheric pressure in communication with the nests at the vacuum removal stations.

40. An apparatus for producing buttons, comprising:
means for retaining at least one button part;
means for advancing the retaining means to at least three button assembly stations including;
a first button part placing station at which a first button part is placed upon the retaining means in a fixed, known rotational orientation;
a second button part placing station comprising means for placing a second button part adjacent the first button part at a predetermined uniform rotational orientation relative to the first button part; and
a pressing station comprising press means for at least partially joining the first and second button parts to form a finished button;
a first detection station including optical means for detecting incomplete or improperly oriented buttons; and
means operatively associated with the optical means for disconnecting assembly of buttons when said optical means detects an incomplete or improperly oriented button.

41. The apparatus of claim 40, further comprising a finished button removal station comprising means for removing finished buttons.

42. The apparatus of claim 40, further comprising an incomplete or improperly oriented button removal station operatively associated with the first detecting means for removing incomplete or improperly oriented buttons from the retaining means.

43. The apparatus of claim 40, further comprising a second detection station located between the first button part placing station and the second button part placing station, the second detection station comprising second means for detecting the presence of the first button part.

44. The apparatus of claim 43 further comprising means operatively associated with the second detecting means for discontinuing assembly of a button.

45. The apparatus of claim 40, further comprising a crimping station comprising means for crimping the button parts, the crimping station located between the first button part placing station and the pressing station.

46. The apparatus of claim 40, wherein the retaining means includes a plurality of nests located in spaced relation on a turntable, and wherein a plurality of stations are located around the turntable for performing button assembly steps as the nests are successively rotated to each of the plurality of stations.

* * * * *